United States Patent
Kay (10) Patent No.: US 8,881,277 B2
(45) Date of Patent: Nov. 4, 2014

(54) METHOD AND SYSTEMS FOR COLLECTING ADDRESSES FOR REMOTELY ACCESSIBLE INFORMATION SOURCES

(75) Inventor: James Kay, Crowthorne (GB)

(73) Assignee: Websense Hosted R&D Limited, Cheshire, Congleton (GB)

( * ) Notice: Subject to any disclaimer, the term of this patent is extended or adjusted under 35 U.S.C. 154(b) by 609 days.

(21) Appl. No.: 12/522,530

(22) PCT Filed: Jan. 4, 2008

(86) PCT No.: PCT/GB2008/050007
§ 371 (c)(1),
(2), (4) Date: Feb. 12, 2010

(87) PCT Pub. No.: WO2008/084259
PCT Pub. Date: Jul. 17, 2008

(65) Prior Publication Data
US 2010/0154058 A1    Jun. 17, 2010

(30) Foreign Application Priority Data

Jan. 9, 2007    (GB) .................................. 0700339.5

(51) Int. Cl.
*H04L 29/06* (2006.01)
*H04L 12/58* (2006.01)
(52) U.S. Cl.
CPC ........ *H04L 63/0236* (2013.01); *H04L 63/1441* (2013.01); *H04L 12/585* (2013.01); *H04L 51/12* (2013.01); *H04L 63/0254* (2013.01)
USPC .............. 726/23; 713/153; 713/154; 713/189
(58) Field of Classification Search
CPC .... H04L 63/1441; H04L 51/12; H04L 12/585
USPC .......................................................... 726/23
See application file for complete search history.

(56) References Cited

U.S. PATENT DOCUMENTS

| 5,333,266 A | 7/1994 | Boaz et al. |
| 5,414,833 A | 5/1995 | Hershey et al. |

(Continued)

FOREIGN PATENT DOCUMENTS

| EP | 1 058 199 | 5/2000 |
| EP | 1 180 889 | 2/2002 |

(Continued)

OTHER PUBLICATIONS

Kang et al., Two Phase Approach for Spam-Mail Filtering, 2005, Computational and Information Science, First International Symposium 2004, vol. 3314, pp. 800-805.*

(Continued)

*Primary Examiner* — Taghi Arani
*Assistant Examiner* — Kenneth Chang
(74) *Attorney, Agent, or Firm* — Knobbe Martens Olson & Bear, LLP (57) ABSTRACT

A method and system are described for collecting addresses for remotely accessible information sources. Messages, such as emails, carried by a messaging network (N1) are intercepted before reaching a destined terminal. Addresses for remotely accessible information sources (i.e. URLs) are identified from the intercepted email messages. The messages are analyzed to be classified as either a first type of message (e.g. spam or virus messages) or a second, different, type of message. If the intercepted message is classified as the first spam/virus type then data indicative of the identified address (URL) is transmitted to a filtering system (100) which controls access to the remotely accessible information sources. As a result, addresses (URLs) are gleaned from transmitted messages such as spam e-mail and supplied to a filtering system (100) which controls access to the resources accessible at those addresses.

16 Claims, 5 Drawing Sheets

(56) References Cited

U.S. PATENT DOCUMENTS

| | | |
|---|---|---|
| 5,581,804 A | 12/1996 | Cameron et al. |
| 5,590,403 A | 12/1996 | Cameron et al. |
| 5,596,330 A | 1/1997 | Yokev et al. |
| 5,619,648 A | 4/1997 | Canale et al. |
| 5,712,979 A | 1/1998 | Graber et al. |
| 5,720,033 A | 2/1998 | Deo |
| 5,724,576 A | 3/1998 | Letourneau |
| 5,742,769 A | 4/1998 | Lee et al. |
| 5,774,668 A | 6/1998 | Choquier |
| 5,801,747 A | 9/1998 | Bedard |
| 5,828,835 A | 10/1998 | Isfeld et al. |
| 5,832,228 A | 11/1998 | Holden et al. |
| 5,855,020 A | 12/1998 | Kirsch |
| 5,896,502 A | 4/1999 | Shieh et al. |
| 5,899,991 A | 5/1999 | Karch |
| 5,899,995 A | 5/1999 | Millier et al. |
| 5,911,043 A | 6/1999 | Duffy et al. |
| 5,919,257 A | 7/1999 | Trostle |
| 5,937,404 A | 8/1999 | Csaszar et al. |
| 5,963,941 A | 10/1999 | Hirakawa |
| 5,987,611 A | 11/1999 | Freund |
| 5,996,011 A | 11/1999 | Humes |
| 5,999,929 A | 12/1999 | Goodman |
| 6,012,832 A | 1/2000 | Saunders et al. |
| 6,052,730 A | 4/2000 | Felciano et al. |
| 6,065,056 A | 5/2000 | Bradshaw et al. |
| 6,065,059 A | 5/2000 | Shieh et al. |
| 6,073,135 A | 6/2000 | Broder et al. |
| 6,092,194 A | 7/2000 | Touboul |
| 6,182,118 B1 | 1/2001 | Finney et al. |
| 6,185,681 B1 | 2/2001 | Zizzi |
| 6,233,618 B1 | 5/2001 | Shannon |
| 6,246,977 B1 | 6/2001 | Messerly et al. |
| 6,266,664 B1 | 7/2001 | Russell-Falla et al. |
| 6,295,529 B1 | 9/2001 | Corston-Oliver et al. |
| 6,295,559 B1 | 9/2001 | Emens et al. |
| 6,301,658 B1 | 10/2001 | Koehler |
| 6,338,088 B1 | 1/2002 | Waters et al. |
| 6,356,864 B1 | 3/2002 | Foltz et al. |
| 6,357,010 B1 | 3/2002 | Viets et al. |
| 6,389,472 B1 | 5/2002 | Hughes et al. |
| 6,418,433 B1 | 7/2002 | Chakrabarti et al. |
| 6,446,061 B1 | 9/2002 | Doerre et al. |
| 6,460,141 B1 | 10/2002 | Olden |
| 6,466,940 B1 | 10/2002 | Mills |
| 6,493,744 B1 | 12/2002 | Emens et al. |
| 6,493,758 B1 | 12/2002 | McLain |
| 6,539,430 B1 | 3/2003 | Humes |
| 6,571,249 B1 | 5/2003 | Garrecht et al. |
| 6,615,242 B1 | 9/2003 | Riemers |
| 6,654,787 B1 * | 11/2003 | Aronson et al. ............... 709/206 |
| 6,675,169 B1 | 1/2004 | Bennett et al. |
| 6,742,003 B2 | 5/2004 | Heckerman et al. |
| 6,785,732 B1 | 8/2004 | Bates et al. |
| 6,804,780 B1 | 10/2004 | Touboul |
| 6,832,230 B1 | 12/2004 | Zilliacus et al. |
| 6,839,680 B1 | 1/2005 | Liu et al. |
| 6,978,292 B1 | 12/2005 | Murakami et al. |
| 6,988,209 B1 | 1/2006 | Balasubramaniam et al. |
| 7,051,200 B1 | 5/2006 | Manferdelli et al. |
| 7,058,822 B2 | 6/2006 | Edery et al. |
| 7,065,483 B2 | 6/2006 | Decary et al. |
| 7,080,000 B1 | 7/2006 | Cambridge |
| 7,089,246 B1 | 8/2006 | O'laughlen |
| 7,100,199 B2 | 8/2006 | Ginter et al. |
| 7,136,867 B1 | 11/2006 | Chatterjee et al. |
| 7,185,361 B1 | 2/2007 | Ashoff et al. |
| 7,203,706 B2 | 4/2007 | Jain et al. |
| 7,209,893 B2 | 4/2007 | Nii |
| 7,213,069 B2 | 5/2007 | Anderson et al. |
| 7,219,299 B2 | 5/2007 | Fields et al. |
| 7,260,583 B2 | 8/2007 | Wiener et al. |
| 7,313,823 B2 | 12/2007 | Gao |
| 7,373,385 B2 | 5/2008 | Prakash |
| 7,376,969 B1 | 5/2008 | Njemanze et al. |
| 7,447,215 B2 | 11/2008 | Lynch et al. |
| 7,487,217 B2 | 2/2009 | Buckingham et al. |
| 7,533,148 B2 | 5/2009 | McMillan et al. |
| 7,536,437 B2 | 5/2009 | Zmolek |
| 7,548,922 B2 | 6/2009 | Altaf et al. |
| 7,562,304 B2 | 7/2009 | Dixon et al. |
| 7,568,002 B1 | 7/2009 | Vacanti et al. |
| 7,587,488 B2 | 9/2009 | Ahlander et al. |
| 7,603,687 B2 | 10/2009 | Pietraszak et al. |
| 7,610,342 B1 | 10/2009 | Pettigrew et al. |
| 7,627,670 B2 | 12/2009 | Haverkos |
| 7,647,383 B1 | 1/2010 | Bowell et al. |
| 7,660,861 B2 | 2/2010 | Taylor |
| 7,664,819 B2 | 2/2010 | Murphy et al. |
| RE41,168 E | 3/2010 | Shannon |
| 7,693,945 B1 | 4/2010 | Dulitz et al. |
| 7,739,338 B2 | 6/2010 | Taylor |
| 7,739,494 B1 | 6/2010 | McCorkendale et al. |
| 7,783,597 B2 | 8/2010 | Kirsch |
| 7,797,443 B1 | 9/2010 | Pettigrew et al. |
| 7,870,203 B2 | 1/2011 | Judge et al. |
| 7,899,866 B1 | 3/2011 | Buckingham et al. |
| 7,941,490 B1 | 5/2011 | Cowings |
| 2001/0032205 A1 | 10/2001 | Kubaitis |
| 2001/0047343 A1 | 11/2001 | Dahan et al. |
| 2001/0047474 A1 | 11/2001 | Takagi |
| 2002/0059221 A1 | 5/2002 | Whitehead et al. |
| 2002/0062359 A1 | 5/2002 | Klopp et al. |
| 2002/0078045 A1 | 6/2002 | Dutta |
| 2002/0087882 A1 | 7/2002 | Schneier et al. |
| 2002/0091947 A1 | 7/2002 | Nakamura |
| 2002/0095592 A1 | 7/2002 | Daniell et al. |
| 2002/0099952 A1 | 7/2002 | Lambert et al. |
| 2002/0120705 A1 | 8/2002 | Schiavone et al. |
| 2002/0129140 A1 | 9/2002 | Peled et al. |
| 2002/0129277 A1 | 9/2002 | Caccavale |
| 2002/0174358 A1 | 11/2002 | Wolff et al. |
| 2002/0199095 A1 * | 12/2002 | Bandini et al. ................ 713/151 |
| 2003/0009495 A1 | 1/2003 | Adjaoute |
| 2003/0018903 A1 | 1/2003 | Greca et al. |
| 2003/0028564 A1 | 2/2003 | Sanfilippo |
| 2003/0074567 A1 | 4/2003 | Charbonneau |
| 2003/0093694 A1 | 5/2003 | Medvinsky et al. |
| 2003/0110168 A1 | 6/2003 | Kester et al. |
| 2003/0110272 A1 | 6/2003 | Du Castel et al. |
| 2003/0135756 A1 | 7/2003 | Verma |
| 2003/0149692 A1 | 8/2003 | Mitchell |
| 2003/0158923 A1 | 8/2003 | Burkhart |
| 2003/0177394 A1 | 9/2003 | Dozortsev |
| 2003/0182420 A1 | 9/2003 | Jones et al. |
| 2003/0182421 A1 | 9/2003 | Faybishenko et al. |
| 2003/0185395 A1 | 10/2003 | Lee et al. |
| 2003/0185399 A1 | 10/2003 | Ishiguro |
| 2003/0229849 A1 | 12/2003 | Wendt |
| 2004/0003139 A1 | 1/2004 | Cottrille et al. |
| 2004/0003286 A1 | 1/2004 | Kaler et al. |
| 2004/0006706 A1 | 1/2004 | Erlingsson |
| 2004/0030913 A1 | 2/2004 | Liang et al. |
| 2004/0034794 A1 | 2/2004 | Mayer et al. |
| 2004/0054498 A1 | 3/2004 | Shipp |
| 2004/0054521 A1 | 3/2004 | Liu |
| 2004/0088570 A1 | 5/2004 | Roberts et al. |
| 2004/0117624 A1 | 6/2004 | Brandt et al. |
| 2004/0128285 A1 | 7/2004 | Green et al. |
| 2004/0139160 A1 | 7/2004 | Wallace et al. |
| 2004/0139165 A1 | 7/2004 | McMillan et al. |
| 2004/0148524 A1 | 7/2004 | Airamo |
| 2004/0153305 A1 | 8/2004 | Enescu et al. |
| 2004/0153644 A1 | 8/2004 | McCorkendale et al. |
| 2004/0172389 A1 | 9/2004 | Galai et al. |
| 2005/0015626 A1 * | 1/2005 | Chasin ........................ 713/201 |
| 2005/0033967 A1 | 2/2005 | Morino et al. |
| 2005/0044156 A1 | 2/2005 | Kaminski et al. |
| 2005/0050222 A1 * | 3/2005 | Packer ........................ 709/238 |
| 2005/0060140 A1 | 3/2005 | Maddox et al. |
| 2005/0066197 A1 | 3/2005 | Hirata et al. |
| 2005/0071748 A1 | 3/2005 | Shipp |
| 2005/0080855 A1 | 4/2005 | Murray |
| 2005/0080856 A1 * | 4/2005 | Kirsch ........................ 709/206 |

(56) References Cited

U.S. PATENT DOCUMENTS

| | | | |
|---|---|---|---|
| 2005/0091535 A1 | 4/2005 | Kavalam et al. | |
| 2005/0108557 A1 | 5/2005 | Kayo et al. | |
| 2005/0120229 A1 | 6/2005 | Lahti | |
| 2005/0131868 A1 | 6/2005 | Lin et al. | |
| 2005/0138353 A1 | 6/2005 | Spies | |
| 2005/0188036 A1 | 8/2005 | Yasuda | |
| 2005/0210035 A1 | 9/2005 | Kester et al. | |
| 2005/0223001 A1 | 10/2005 | Kester et al. | |
| 2005/0251862 A1 | 11/2005 | Talvitie | |
| 2005/0256955 A1 | 11/2005 | Bodwell et al. | |
| 2005/0257261 A1* | 11/2005 | Shraim et al. | 726/22 |
| 2005/0273858 A1 | 12/2005 | Zadok et al. | |
| 2005/0283836 A1 | 12/2005 | Lalonde et al. | |
| 2005/0283837 A1 | 12/2005 | Olivier et al. | |
| 2006/0004636 A1 | 1/2006 | Kester et al. | |
| 2006/0010217 A1 | 1/2006 | Sood | |
| 2006/0026105 A1 | 2/2006 | Endoh | |
| 2006/0031311 A1 | 2/2006 | Whitney et al. | |
| 2006/0031359 A1 | 2/2006 | Clegg et al. | |
| 2006/0031504 A1 | 2/2006 | Hegli et al. | |
| 2006/0036874 A1 | 2/2006 | Cockerille et al. | |
| 2006/0053488 A1 | 3/2006 | Sinclair et al. | |
| 2006/0059238 A1 | 3/2006 | Slater et al. | |
| 2006/0068755 A1 | 3/2006 | Shraim et al. | |
| 2006/0069697 A1 | 3/2006 | Shraim et al. | |
| 2006/0075494 A1 | 4/2006 | Bertman et al. | |
| 2006/0075500 A1 | 4/2006 | Bertman et al. | |
| 2006/0080735 A1 | 4/2006 | Brinson et al. | |
| 2006/0095459 A1 | 5/2006 | Adelman et al. | |
| 2006/0095965 A1 | 5/2006 | Phillips et al. | |
| 2006/0101514 A1 | 5/2006 | Milener et al. | |
| 2006/0122957 A1* | 6/2006 | Chen | 707/1 |
| 2006/0129644 A1 | 6/2006 | Owen et al. | |
| 2006/0161986 A1 | 7/2006 | Singh et al. | |
| 2006/0168006 A1 | 7/2006 | Shannon et al. | |
| 2006/0168022 A1 | 7/2006 | Levin et al. | |
| 2006/0191008 A1 | 8/2006 | Fernando et al. | |
| 2006/0206713 A1* | 9/2006 | Hickman et al. | 713/176 |
| 2006/0253537 A1 | 11/2006 | Thomas | |
| 2006/0259948 A1 | 11/2006 | Calow et al. | |
| 2006/0265750 A1 | 11/2006 | Huddleston | |
| 2006/0277280 A1 | 12/2006 | Craggs | |
| 2006/0288076 A1 | 12/2006 | Cowings et al. | |
| 2007/0005762 A1 | 1/2007 | Knox et al. | |
| 2007/0011739 A1 | 1/2007 | Zamir et al. | |
| 2007/0028302 A1 | 2/2007 | Brennan et al. | |
| 2007/0078936 A1 | 4/2007 | Quinlan et al. | |
| 2007/0083929 A1 | 4/2007 | Sprosts et al. | |
| 2007/0124388 A1 | 5/2007 | Thomas | |
| 2007/0130351 A1 | 6/2007 | Alperovitch et al. | |
| 2007/0156833 A1 | 7/2007 | Nikolov et al. | |
| 2007/0195779 A1 | 8/2007 | Judge et al. | |
| 2007/0260602 A1 | 11/2007 | Taylor | |
| 2007/0282952 A1 | 12/2007 | Lund et al. | |
| 2007/0294352 A1 | 12/2007 | Shraim et al. | |
| 2007/0299915 A1 | 12/2007 | Shraim et al. | |
| 2008/0077517 A1 | 3/2008 | Sappington | |
| 2008/0082662 A1 | 4/2008 | Dandliker et al. | |
| 2008/0086372 A1 | 4/2008 | Madhavan et al. | |
| 2008/0184366 A1 | 7/2008 | Alperovitch et al. | |
| 2008/0267144 A1 | 10/2008 | Jano et al. | |
| 2008/0295177 A1 | 11/2008 | Dettinger et al. | |
| 2009/0138573 A1 | 5/2009 | Campbell et al. | |
| 2010/0205265 A1 | 8/2010 | Milliken et al. | |

FOREIGN PATENT DOCUMENTS

| | | |
|---|---|---|
| EP | 1 278 330 | 1/2003 |
| EP | 1 280 040 | 1/2003 |
| EP | 1 318 468 | 6/2003 |
| EP | 1 329 117 | 7/2003 |
| EP | 1 457 885 | 9/2004 |
| EP | 1 484 893 | 12/2004 |
| EP | 1 494 409 | 1/2005 |
| EP | 1 510 945 | 3/2005 |
| EP | 1 638 016 | 3/2006 |
| EP | 1 643 701 | 4/2006 |
| GB | 2418330 | 3/2006 |
| JP | 10 243018 | 9/1998 |
| JP | 2000-235540 | 8/2000 |
| WO | WO 96/05549 A1 | 2/1996 |
| WO | WO 96/42041 | 12/1996 |
| WO | WO 01/24012 | 4/2001 |
| WO | WO 01/33371 | 5/2001 |
| WO | WO 01/55905 | 8/2001 |
| WO | WO 01/75651 | 10/2001 |
| WO | WO 2004/077710 | 9/2004 |
| WO | WO 2005/010692 | 2/2005 |
| WO | WO 2005/017708 | 2/2005 |
| WO | WO 2005/022319 | 3/2005 |
| WO | WO 2005/074213 | 8/2005 |
| WO | WO 2005/119488 | 12/2005 |
| WO | WO 2006/027590 | 3/2006 |
| WO | WO 2006/030227 A1 | 3/2006 |
| WO | WO 2006/062546 | 6/2006 |
| WO | WO 2006/136605 | 12/2006 |
| WO | WO 2008/008339 | 1/2008 |

OTHER PUBLICATIONS

Abiteboul, et al., The Lorel query language for semistructured data, Int'l Journal on Digital Libraries, Apr. 1, 1997, vol. 1, Issue 1, pp. 68-88.

Adam Lyon, "Free Spam Filtering Tactics Using Eudora,", May 21, 2004, pp. 1-4.

Chawathe, et al., Representing and querying changes in a semistructured data, Proceedings from 14th Int'l Conference, Feb. 23-27, 1998, pp. 4-13.

Cohen, F., A Cryptographic Checksum for Integrity Protection, Computers & Security, Elsevier Science Publishers, Dec. 1, 1987, vol. 6, Issue 6, pp. 505-510, Amsterdam, NL.

Dahan, M. Ed., "The Internet and government censorship: the case of the Israeli secretservice" Online information., Proceedings of the International Online Information Meeting, Oxford, Learned Infomration, GB, Dec. 12-14, 1989, vol. Meeting 13, December, Issue XP000601363, pp. 41-48, Sections 1,3., London.

Dell Zhang, et al., A data model and algebra for the web, Proceedings 10th Int'l Workshop on Florence, Italy, Sep. 1-3, 1999, pp. 711-714.

Gittler F., et al., The DCE Security Service, Pub: Hewlett-Packard Journal, Dec. 1995, pp. 41-48.

Goldman, R., et al., DataGuides: Enabling Query Formulation and Optimization in Semistructured Databases, Proceedings of the International Conference on Very Large Data Bases, Aug. 26, 1997, pp. 436-445.

IBM Technical Disclosure Bulletin, Mean to Protect System from Virus, IBM Corp., Aug. 1, 1994, Issue 659-660.

Igakura, Tomohiro et al., Specific quality measurement and control of the service-oriented networking application., Technical Report of IEICE, IEICE Association, Jan. 18, 2002, vol. 101, Issue 563, pp. 51-56, Japan.

International Search Report and Written Opinion dated Jun. 30, 2008 for PCT Patent Application No. PCT/US2007/024557.

International Search Report and Written Opinion for International Application No. PCT/GB2005/003482, Dec. 9, 2005.

IronPort Web Reputation: Protect and Defend Against URL-Based Threats; Ironport Systems, Apr. 2006, 8 pages.

Nestorov, et al., Representative objects: concise representations of semistructured, hierarchical Data, Proceedings, 13th Int'l Conference in Birmingham, UK, Apr. 7-11, 1997, pp. 79-90.

PCT International Search Report and Written Opinion for International Application No. PCT/US2008/052483, PCT, Feb. 11, 2009.

PCT International Search Report for Application No. PCT/EP2006/063474, PCT, Sep. 2006.

Reid, Open Systems Security: Traps and Pitfalls, Computer & Security, 1995, Issue 14, pp. 496-517.

Resnick, P. et al., "PICS: Internet Access Controls Without Censorship", Communications of the Association for Comuting Machinery, ACM, Oct. 1, 1996, vol. 39, Issue 10, pp. 87-93, New York, NY.

(56) References Cited

OTHER PUBLICATIONS

Stein, Web Security—a step by step reference guide, Addison-Wesley, 1997, pp. 387-415.

Symantec Corporation, E-security begins with sound security policies, Announcement Symantec, XP002265695, Jun. 14, 2001, pp. 1,9.

Williams, R., Data Integrity with Veracity, Retrieved from the Internet: <URL : ftp://ftp.rocksoft.com/clients/rocksoft/papers/vercty10.ps>, Sep. 12, 1994.

Zhang et al., The Role of URLs in Objectionable Web Content Categorization, Web Intelligence, 2006.

"Google + StopBadward.org = Internet Gestapo?", http://misterpoll.wordpress.com/2007/01/05/google-stopbadwareorg-internet-gestapo/, Jan. 5, 2007.

"Trends in Badware 2007", StopBadware.org.

George, Erica, "Google launches new anti-badware API", http://blog.stopbadware.org//2007/06/19/google-launches-new-anti-badware-api, Jun. 19, 2007.

Wang et al., MBF: a Real Matrix Bloom Filter Representation Method on Dynamic Set, 2007 IFIP International Conference on Network and Parallel Computing—Workshops, Sep. 18, 2007, pp. 733-736, Piscataway, NJ, USA.

IronPort Web Reputation White Paper, A Comprehensive, Proactive Approach to Web-Based Threats, Ironport Systems 2009, pp. 10.

Forte, M. et al., "A content classification and filtering server for the Internet", Applied Computing 2006. 21st Annual ACM Symposium on Applied Computing, [online] http://portal.acm.org/citation.cfm?id=1141553&coll=portal&dl=ACM&CFID=2181828&CFTOKEN=68827537> [retrieved on Dec. 7, 2007], Apr. 23, 2006-Apr. 27, 2006, pp. 1166-1171.

\* cited by examiner

METHOD AND SYSTEMS FOR COLLECTING ADDRESSES FOR REMOTELY ACCESSIBLE INFORMATION SOURCES

FIELD OF THE INVENTION

The present invention relates in general to a method of, and system for, collecting addresses for remotely accessible information sources. Embodiments of the invention are particularly suited for use in updating a filtering system which controls access to links to web pages. The invention is particularly well suited for collecting such addresses from electronic messages and short messages such as Wireless Access Protocol (WAP) and Multimedia Messaging Systems (MMS) messages.

BACKGROUND OF THE INVENTION

The Internet is a global system of computers that are linked together to facilitate communication between computers. These computers can be accessed by users so as to download and display informational pages therefrom. The easy access and inexpensive cost of retrieving Internet pages has led to several problems for controlling access to inappropriate information, such as pornography. Several solutions to this problem have been proposed, including rating systems similar to that used for rating movies so that a parent or employer can control access to Internet servers, or pages, that have a particular rating. In addition to a rating scheme, others have developed databases that contain the uniform resource locator (URL) address of sites to be blocked. These databases are integrated into network computer systems and Internet firewalls so that a person wishing access to the Internet first has their URL request matched against the database of blocked sites and is denied access to access any URL found in the database. One such system is described in U.S. Pat. No. 5,678,041.

Such systems rely on the completeness of the database of accessed sites, and, since new servers and URLs are being added to the Internet on a daily basis, these databases do not provide a complete list of sites that should be blocked. An improvement to the system described in U.S. Pat. No. 5,678,041 is presented in EP1318468, which describes a system distributed between a central "database factory" arranged to perform URL categorization and to store the results of the categorization in a central database, and many local "access systems", each of which is associated with a given LAN and can connect to the database factory. Any given access system is loaded with a copy of, and updates to, the categorization data from the database factory, and additionally includes a so-called filter module, which can perform a certain amount of processing in relation to uncategorized URLs. These uncategorized URLs are any URLs that are requested by a client on the LAN and that are not listed in the categorised data downloaded from the database factory.

When a local access system receives a URL request from a client machine on its LAN, it can often identify a category for that URL on the basis of the categorisation data received from the database factory. However, if a category cannot be obtained from the database factory, the local filter module will perform some local processing such as text processing in order to identify whether or not it is safe for the client to access the URL. The output of the local processing will be stored in association with the uncategorized URL. For any given accessed URL the filter module also stores a counter, which is incremented whenever a given URL is requested. At certain times—e.g. at a set time, at a random time, every n units of time, or when a given URL has been requested a specified number of times—the database factory requests the uncategorized URL and any associated processed data from an access system. Since the database factory collects data from different access systems and downloads its output to each of the access systems, any given access system can benefit from knowledge obtained via URL requests received from access systems connected to unrelated LANs.

One feature that is common to all known internet access control systems is the trigger for the URL analysis, which is the receipt of a request for access to a given URL; thus analysis of URLs is triggered by a direct request for access to a computer on the Internet corresponding to the URL.

SUMMARY OF THE INVENTION

According to the present invention there is provided an apparatus and method as set forth in the appended claims. Other features of the invention will be apparent from the dependent claims, and the description which follows.

In one aspect the present invention there is provided a method of collecting addresses for remotely accessible information sources for use in updating a filtering system which controls access to such information via a public access network, the method comprising: interrupting transmission of a message destined for a terminal other than the filtering system; identifying an address for a remotely accessible information source from the message; analyzing the message on the basis of an attribute of the received message so as to classify the received message as either a first type of message or a second, different, type of message; and if the received message is classified as the first type of message, transmitting a message comprising data indicative of the identified address to the filtering system.

Thus with embodiments of the invention, addresses for remotely accessible information sources such as URLs are captured from analysis of messages, such as electronic messages, which are transmitted through the network. This provides a new and request-independent source of potentially problematic URLs to a URL filtering system, and one that operates asynchronously with respect to the filtering system.

In one arrangement the received message comprises a message body which contains data specifying a network location corresponding to a remotely accessible information source, and the method includes analysing the transmitted electronic message on the basis of a criterion relating to the network location specified within the message so as to classify the message as a first or a second type of message.

In another arrangement the transmitted message can be analysed on the basis of a criterion relating to an attribute of the message such as sender (name, IP address), subject line and subject matter contained with the message, so as to classify the message as a first or a second type of message. Typical examples of first types of messages include spam, virus and phishing classifications, and the analysis can include deriving a message pattern for the message and comparing the derived message pattern with message patterns associated with previously transmitted messages.

Embodiments of the invention also provide a system for classifying messages and transmitting data indicative of potentially problematic URLs to a URL filtering system. Preferably the functionality is provided as part of an email analysis system, so that the identification of potentially problematic URLs is a by-product of in-transmit email analysis. Further features and advantages of the invention will become apparent from the following description of preferred embodiments of the invention, given by way of example only, which is made with reference to the accompanying drawings.

BRIEF DESCRIPTION OF THE DRAWINGS

FIG. 1b is a schematic timing diagram showing an overview of data transfer between the various components shown in FIG. 1a;

DETAILED DESCRIPTION OF THE INVENTION

As described above, embodiments of the invention provide a system for capturing and categorizing URLs. In comparison to known systems, in which URLs are captured as part of a user request to access the URL, with embodiments of the invention URLs are captured during a process involving steps other than receiving a direct request from a user. In at least some embodiments of the invention, a given URL is captured as a by-product of another process, and, broadly speaking, the trigger for, and process for categorisation of, the given URL is decoupled from user requests to access the given URL.

Figure 1A:
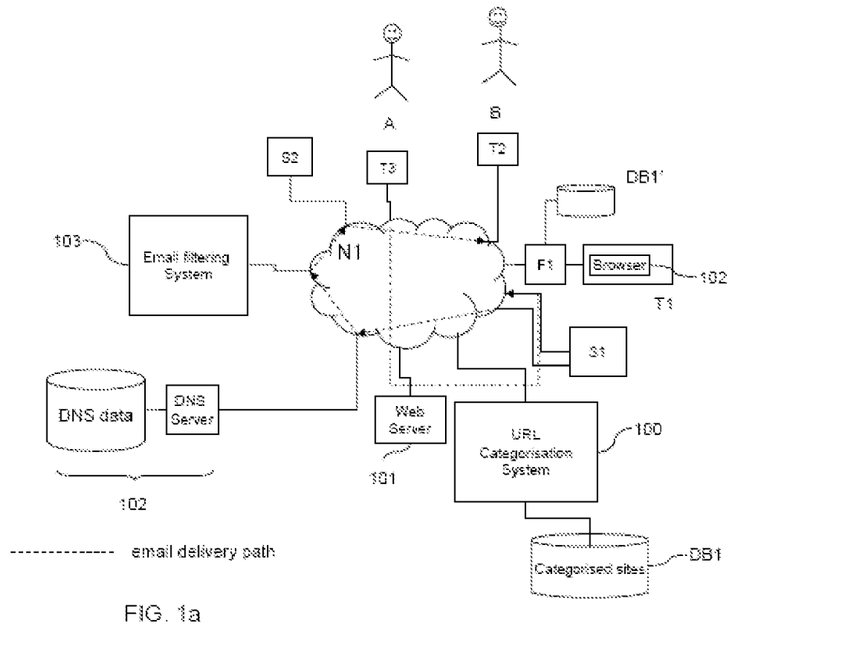
FIG. 1a is a schematic block diagram showing components of an email filtering system and categorisation system within which embodiments of the invention operate.

Turning to FIG. 1a, an overview of a categorisation system 100 with which embodiments of the invention operate will first be described. The system 100 enables a terminal T1 to request data from a web server 101 via a browser 102 or a bespoke client application loaded on the terminal T1. The categorisation system 100 is arranged to filter (control and/or analyze) the terminal's T1 access to resources and the functionality to achieve this monitoring of the terminal T1 can be split between a local filter module F1 and the categorisation system 100, which together can provide for the real-time or off-line filtering of computer network access so as to analyse the data associated with the attempted access of the resources and, where appropriate, permit data, etc. to be downloaded from the address associated with the access request to the web server 101. The categorisation system 100 cooperates with a database DB1, which is arranged to store details of URLs and a category assigned thereto, and, in arrangements including a local filter module F1 in addition to the categorisation system 100, a copy of the categorised data held in the database DB1 is stored in a mirror database shown as DB1'.

Figure 1B:
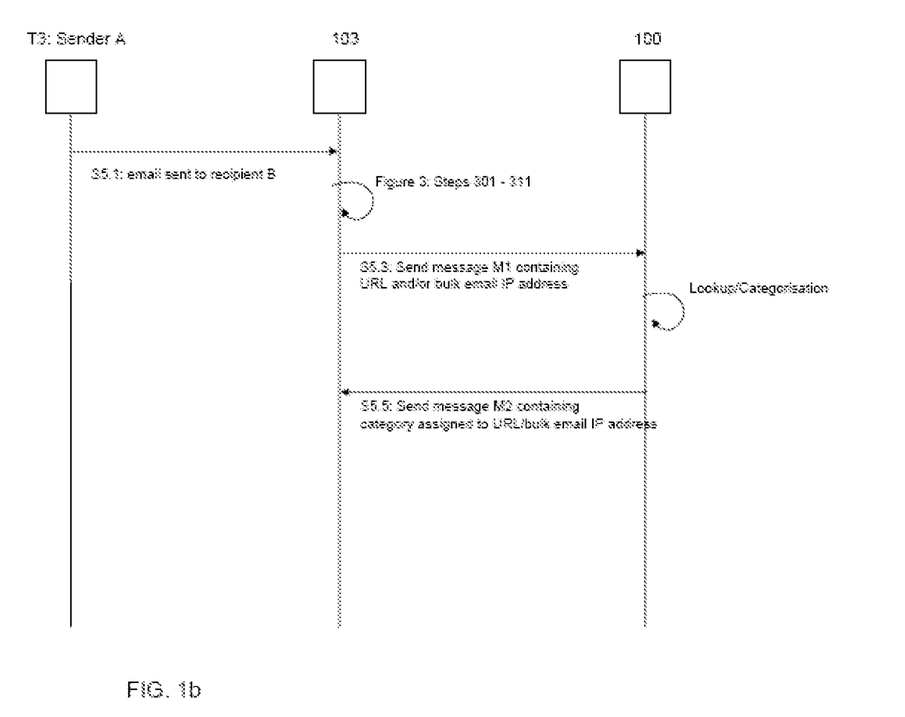

FIG. 1a also shows network elements associated with an email filtering system 103, which, in one embodiment, is used to capture URLs and send them onto the categorisation system 100. The email filtering system 103 is implemented within the normal delivery path of an email and utilised to identify spam emails, phishing emails or viruses; referring to FIGS. 1a and 1b, such a delivery path is shown in the context of sender A creating and sending an email to recipient B: the email is sent from terminal T3, at which the sender A has composed the email, and is delivered to a terminal T2 corresponding to the email address of the email. As is known in the art, the email is sent from terminal T3 to a local mail server S1 cooperating with terminal T3, which may reside on a local area network or at an ISP; when the local mail server S1 receives the email, the mail server S1 queries a Domain Name Server (DNS) 101 to obtain the Internet Protocol (IP) address for the recipient's email address. According to a preferred arrangement, the DNS record corresponding to the recipient's address is preconfigured to comprise data identifying a email filtering system 103 (e.g. by modifying the associated mail exchange (MX) record), which means that all emails destined for recipient B are automatically directed to the email filtering system 103 instead of to the mail server corresponding to recipient B's email address.

Figure 2:
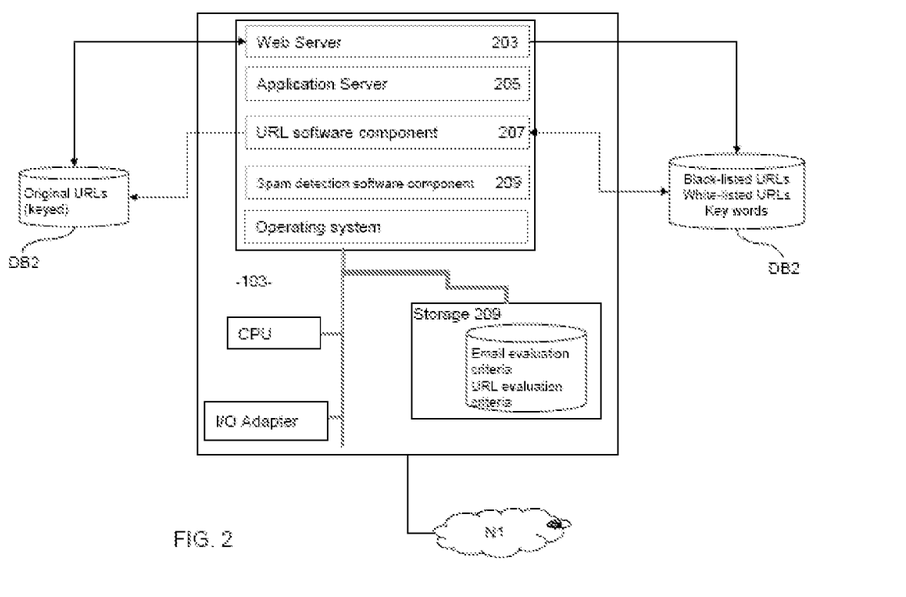
FIG. 2 is a schematic block diagram showing components of an email filtering system according to embodiments of the invention.

As shown in FIG. 2 the email filtering system 103 preferably comprises an application server, a web server, various conventional and bespoke processing components, and can comprise one or a plurality of machines, which collectively analyse emails in accordance with various criteria, as described in more detail below. The email filtering system 103 is connected to various servers and gateways, typically via a public network such as the Internet N1, including the destination email server S2 corresponding to the recipient's email address.

Figure 3:
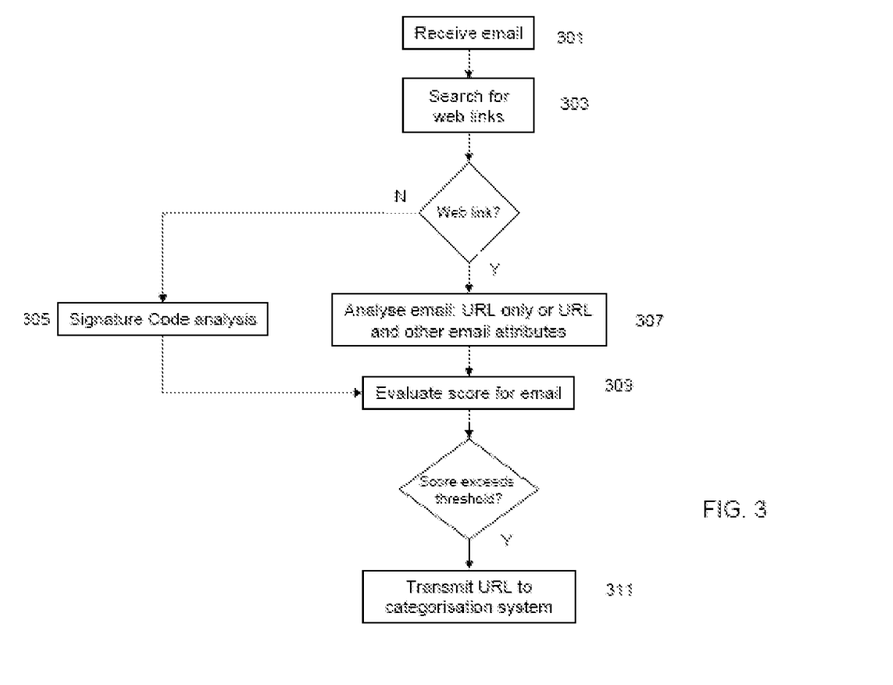
FIG. 3 is a schematic flow diagram showing steps performed by the email filtering system of FIG. 2.

Under certain conditions, such as when an email contains a URL satisfying various conditions or when the email originates from a source identified to be a certain type of Internet service, the email filtering system 103 sends data indicative of the URL and/or source address of the email to the categorisation system 100. This action can be performed and at the same time as, or before, taking action in relation to the email itself. Turning to FIG. 3, when an email is received by the email filtering system 103, it is passed to the application server 205 for processing by the URL software component 207 (step 301). Once received by the URL software component 207, the email is analysed for the presence of otherwise of one or more web links (step 303); in the event that no such link is identified, the software component 207 passes the email to the spam detection software component 209 for signature code and other similar email analysis and, if appropriate, subsequently to the application server 205 for routing to server S2 in the normal manner (step 305).

In one embodiment, the presence of a URL string may be detected in an email formatted in accordance with a mark-up language (e.g., HTML) based on formatting data surrounding the URL string in the message. For example, in the HTML message, the URL string may have the following format: <a href="http://www.sesame.com">, in which case the software component 207 is configured to search through the HTML message for a string comprising "http:" or "href=", extracting the data immediately following this string.

In the case where the email is determined to contain a URL, the software component 207 can proceed to analyse the email (step 307), either on the basis of the URL alone or in conjunction with an analysis of other features of the email (such as subject, format of sender and recipient address, or text within the email); methods are known in the art for performing such analysis of an email and are commonly referred to as "Spam detection methods".

In relation to the URL, the software component 207 can review the URL on the basis of one or more of the following parameters, which are stored in storage 209:

Domains: URLs may include sub-domains and redirections to target URLs, and the which points to the same target URL. For example, URL "http://spamtastic.test.co.uk" can be specified from URLs that include different sub-domains. Accordingly the URL string can be examined for the presence of different sub-domains (here there are two: spamtastic.test.co.uk; test.co.uk);

Redirect URLs: a URL can comprise another URL that points to a particular target URL; for example, the URL "http://random.com/date/03/*http://www.spamtasic- .co.uk" actually points to the target URL "http://www.s-pamtasic.co.uk". Accordingly the URL string can be examined for redirection to a different URL;

Extraneous information within the URL: a user name, password, "@" signs, numeric character references (which specify the code position of a character in the document character set), character entity references (which use symbolic names), buffer overflows, null-padding, and embedded null characters. Accordingly the URL string can be examined for the presence of such information;

Certain words within the URL: pornographic or offensive words, stored for example in the database DB2. Accordingly the URL string can be examined for the presence of such words.

In addition, the email filtering system 103 can maintain, or have access to, a URL blacklist that includes URLs that are known to be indicative of spam and/or relating to an email virus and/or phishing, and the software component 207 can be arranged to compare the or each URL within the email with those listed in the black-list; when the blacklisted URLs are stored as hash values, it is convenient for the software component 207 to generate a hash value of the or each URL within the email, enabling the comparison to be performed on the basis of the generated and stored hash values.

In one arrangement, the email is scored on the basis of one, some or all of the above parameters, and the individual scores are combined dependent on prespecified weightings. Once an overall score has been evaluated the software component 207 compares the score with a predetermined threshold (step 309); in the event that the score exceeds the threshold, data indicative of the URL is transmitted to the categorisation system 100, as a categorisation request message M1.

As described above, the email filtering system 103 is capable of applying various spam detection techniques to incoming emails via spam detection software component 209; in relation to emails that do not contain a URL link, these are subject to analysis on the basis of subject, format of sender and recipient address, and/or text within the email so as to derive a signature code for the email (step 305). As a result of such analysis, data corresponding to the various email attributes can be stored in the database DB2, and for those emails determined to be one of a batch of bulk emails—in other words an email with a text portion (signature code) identical to that sent to at least one other recipient—the email filtering system 103 can send a categorisation request message M1 comprising data indicative of the originating address of the emails to the categorisation system 100.

Preferably the categorisation request message M1 includes data indicative of the type of classification derived by the email filtering system 103 as a result of the above-mentioned analysis; for example the categorisation request message M1 includes fields associated with spam, virus and phishing classifications, and if a respective field of a given categorisation request message M1 includes a "1" therein, this indicates an associated classification to the categorisation system 100. This can aid machine-recognition by the categorisation system 100.

Embodiments of the invention thus advantageously provide a new mechanism for notifying URLs to the categorisation system 100, and since the categorisation request messages M1 are received independently of a request to access the URL, processing of the request and categorisation of the URL is handled independently of the processing of client-originating resource access requests. As a result, a greater number and variety of URLs will be analysed (and categorised) than is possible with conventional systems, importantly without incurring any additional overheads in relation to the processing of client-originating resource access requests. In addition and in view of this new source of URLs, the repository of categorised URLs is significantly increased, increasing the probability that a previously unseen client-originating resource access request can be served with a response indicative of a (previously assigned) category.

The components and operation of the categorisation system 100 will now be described; whilst the nature of the categorisation performed by the system 100 is conventional, the categorisation system 100 is uniquely configured to respond to requests from nodes other than an authenticated client device. In addition, the categorisation system 100 is selectively arranged to respond to the categorisation request messages M1 to transmit a (prestored) category and/or to store the results of the categorisation and/or to transmit the results of the categorisation in a response message M2 in dependence on the source of the categorisation request message M1.

Figure 4:
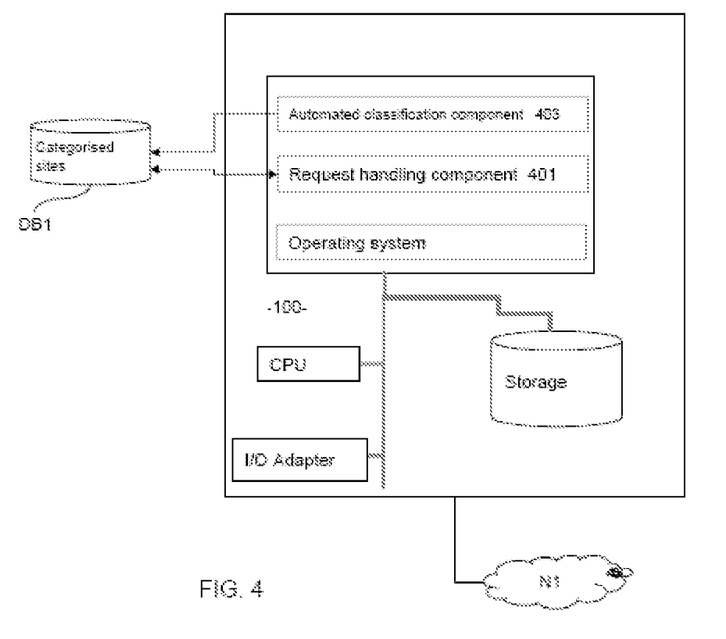
FIG. 4 is a schematic block diagram showing components of a categorisation system according to embodiments of the invention.

Turning now to FIG. 4, in one arrangement the categorisation system 100 comprises various conventional input/output, storage, memory and operating system processing components together with various bespoke processing components including a request handling component 401 for receiving categorisation requests, and an automated categorization or classification component 403 to determine the appropriate category or categories of the URL. The request handling component 401 is configured to identify the source of the categorisation request message M1, to retrieve the URL within the categorisation request message M1 and to determine, on the basis of the data stored in database DB1, whether the URL in the request message M1 requires categorizing. If the URL has not been previously analysed, the request handling component 401 passes the URL and any additional data associated with the URL to the categorization component 403. If the URL has already been categorised (i.e. if it is stored in the database DB1), the request handling component 401 is arranged to retrieve the category from the database DB1 and to create a message M2 having a message body containing the category for transmission to the source of the categorisation request message M1, namely the email filtering system 103. In the event that the categorisation request message M1 identified a URL that had been retrieved from within an email (as opposed to a sender of bulk emails), the email filtering system 103 stores the category data in conjunction with the URL in the database DB2 upon receipt thereof. Thus this category information advantageously provides a second level check in relation to the analysis performed at steps 305 and 307 by the email filtering system 103, and can be utilised in any decisions taken in relation to the handling of the emails in which the URL originated.

Assuming the message M1 to contain an URL corresponding to (a) page(s) held by the web server S1, the categorisation component 403 retrieves the page(s) from the server S1 and parses the page using a categorization engine to determine the appropriate category or categories of the URL, determining statistical probabilities and multidimensional vectors during the categorization process. Categorization can be based upon word analysis, adaptive learning systems, and/or image analysis, in which case the categorization component 403 can include a language analyser arranged to determine the language of the website for a given URL; examples of suitable techniques are described in International Patent Application having publication number WO0163835. In addition the categorization component 403 can interface with a human checker to determine the appropriate category or categories of the URL.

Once the web page corresponding to the URL has been categorized, the categorization component 403 can be arranged to store the URL along with its associated one or more categories in the database DB1 of categorized sites; the database DB1 includes functionality for scheduling updates to local filter modules such as F1 so as to ensure that the URL and its associated category or categories are copied to the mirror database DB1'.

The above embodiments are to be understood as illustrative examples of the invention. Further embodiments of the invention are envisaged. For example, the request handling component 401 can be configured to respond to categorisation request messages from analysers associated with processing of Wireless Access Protocol (WAP) and Multimedia Messaging Systems (MMS) messages It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A computerized method of collecting potentially problematic Uniform Resource Locators (URLs), the method comprising:
   receiving, via an email filtering system, an email message destined for a recipient email address, the email filtering system connected to a destination email server corresponding to the recipient email address;
   identifying, via an electronic processor, a URL from the email message;
   analyzing, via the electronic processor, the email message on the basis of one or more of the URL, the email message subject, format of sender and recipient address of the email message, or text within the email message so as to classify the email message as either a first type of email message or a second, different, type of email message, wherein the first type and the second type are mutually exclusive;
   if the email message is classified as the first type of email message, transmitting a message from the email filtering system to a separate URL filtering system, which controls access to URLs via a public access network, the message requesting the URL filtering system to categorize the URL, wherein the message is transmitted independent of a request to access the URL; and
   if the email message is classified as the second type of email message, not transmitting a message from the email filtering system to the URL filtering system requesting the URL filtering system to categorize the URL.

2. The method according to claim 1, further comprising analyzing the message on the basis of a criterion relating to the URL specified within the message so as to classify the message as a first or a second type of message.

3. The method according to claim 1, including analyzing the transmitted message on the basis of a criterion relating to at least one other attribute of the message so as to classify the message as a first or a second type of message.

4. The method according to claim 3, in which the criterion relating to another attribute of the message includes the sender address.

5. The method according to claim 3, including deriving a message pattern for the message and comparing the derived message pattern with message patterns associated with previously analyzed messages, so as to analyze the message and classify the message as a first or a second type of message.

6. The method according to claim 1, wherein the message is an electronic message.

7. The method according to claim 6, in which the first type of message comprises a spam email message.

8. The method according to claim 6, in which the first type of message comprises an email virus.

9. The method according to claim 6, in which the first type of message comprises a phishing message.

10. The method according to claim 1, wherein the message is a Wireless Access Protocol (WAP) message.

11. The method according to claim 1, wherein the message transmitted to the filtering system further comprises data indicative of the first type of message.

12. The method of claim 1, wherein the URL filtering system is arranged to permit data to be download from addresses associated with an access request to a web server.

13. The method of claim 1, wherein the URL identified in the message is uncategorized by the URL filtering system at the time it is identified.

14. The method of claim 1, wherein the URL was included in the message by an original message sender.

15. The method of claim 1, wherein the URL filtering system controls whether data may be downloaded from a network address specified by a URL.

16. A message processing system for use in updating a Uniform Resource Locator (URL) filtering system with potentially problematic URLs, the message processing system comprising:
   a hardware interface for receiving an email message destined for a recipient email address, wherein the message processing system is connected to a destination email server corresponding to the recipient email address; and
   a central processing unit configured to execute a message processor arranged to identify a URL from the message, the message processor being arranged to analyze the message on the basis of one or more of the URL, the email message subject, format of sender and recipient address of the email message, or text within the email message so as to classify the message as either a first type of message or a second, different, type of message, wherein the first type and the second type are mutually exclusive,
   wherein the interface is arranged to transmit a filter message to the URL filtering system, which controls access to URLs via a public access network, in the event that the message is classified as the first type of message, wherein the filter message requests the URL filtering system, which is separate from the message processing system, to categorize the URL, wherein the request to categorize the URL is transmitted independent of a request to access the URL, and wherein the interface is further arranged not to transmit a filter message to the filtering system in the event that the email message is classified as the second type of message.

* * * * *